US012750139B2

(12) United States Patent
Filip

(10) Patent No.: US 12,750,139 B2
(45) Date of Patent: Sep. 29, 2026

(54) ELECTRICAL-TO-COHERENT OPTICAL-TO-ELECTRICAL DATA COMMUNICATION CABLE ASSEMBLY

(71) Applicant: Jan Filip, Portland, OR (US)

(72) Inventor: Jan Filip, Portland, OR (US)

( * ) Notice: Subject to any disclaimer, the term of this patent is extended or adjusted under 35 U.S.C. 154(b) by 706 days.

(21) Appl. No.: 18/118,496

(22) Filed: Mar. 7, 2023

(65) Prior Publication Data

US 2024/0305378 A1 Sep. 12, 2024

(51) Int. Cl.

| | |
|---|---|
| ***H04B 10/00*** | (2013.01) |
| ***H04B 10/43*** | (2013.01) |
| ***H04B 10/61*** | (2013.01) |
| ***H04J 14/02*** | (2006.01) |
| ***H04J 14/06*** | (2006.01) |
| *H04J 14/00* | (2006.01) |

(52) U.S. Cl.

CPC ........... *H04B 10/43* (2013.01); *H04B 10/614* (2013.01); *H04J 14/0279* (2013.01); *H04J 14/06* (2013.01)

(58) Field of Classification Search

CPC ........ H04B 10/40; H04B 10/43; H04B 10/50; H04B 10/503; H04B 10/505; H04B 10/548; H04B 10/556; H04B 10/61; H04B 10/513; H04B 10/514

See application file for complete search history.

(56) References Cited

U.S. PATENT DOCUMENTS

2008/0050123 A1 2/2008 Wang et al.
2016/0274304 A1* 9/2016 Bickham ............ H04B 10/2507
2019/0181962 A1 6/2019 Ibragimov
2019/0229811 A1 7/2019 Gupta et al.
2019/0245618 A1 8/2019 Bruno et al.
2020/0049905 A1* 2/2020 Tomita ..................... G02B 6/42

FOREIGN PATENT DOCUMENTS

WO 2023004567 A1 2/2023

OTHER PUBLICATIONS

PCT/US2024/012830. International Search Report & Written Opinion (May 6, 2024).

* cited by examiner

*Primary Examiner* — Daniel G Dobson

(74) *Attorney, Agent, or Firm* — George Fountain; LOZA & LOZA, LLP

(57) ABSTRACT

A data communication cable assembly, comprising: a first connector configured to connect to a first device, including a first coherent optical transmitter configured to: receive a first electrical data signal from the first device; and coherently modulate a first optical carrier with the first electrical data signal to generate a first optical data signal; a cable including a first end mechanically coupled to the first connector, wherein the cable comprises at least one optical fiber; and a second connector mechanically coupled to a second end of the cable, and configured to connect to a second device, including a first coherent optical receiver configured to: receive the first optical data signal from the first coherent optical transmitter via the at least one optical fiber; and coherently demodulate the first optical data signal using the first or a second optical carrier to regenerate the first electrical data signal for the second device.

11 Claims, 4 Drawing Sheets

ELECTRICAL-TO-COHERENT OPTICAL-TO-ELECTRICAL DATA COMMUNICATION CABLE ASSEMBLY

FIELD

Aspects of the present disclosure relate generally to data communication cables and systems, and in particular, to an electrical-to-coherent optical-to-electrical communication cable assembly.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a data communication cable assembly, comprising: a first connector configured to connect to a first device, wherein the first connector includes a first coherent optical transmitter configured to: receive a first electrical data signal from the first device; and coherently modulate a first optical carrier with the first electrical data signal to generate a first optical data signal; a cable including a first end mechanically coupled to the first connector, wherein the cable comprises at least one optical fiber; and a second connector mechanically coupled to a second end of the cable, and configured to connect to a second device, wherein the second connector includes a first coherent optical receiver configured to: receive the first optical data signal from the first coherent optical transmitter via the at least one optical fiber; and coherently demodulate the first optical data signal using the first or a second optical carrier to regenerate the first electrical data signal for the second device.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

Figure 1:
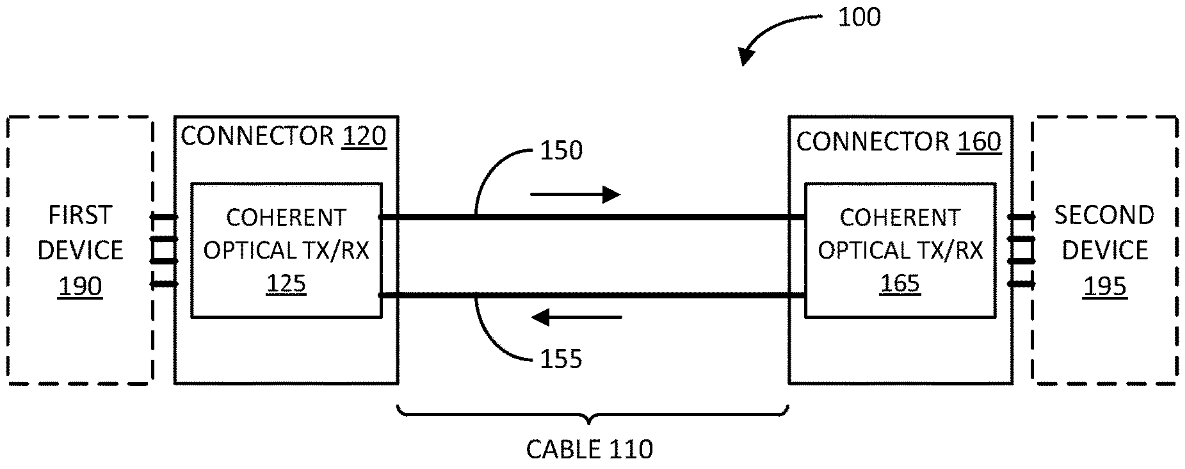
FIG. 1 illustrates a block diagram of an example data communication cable assembly in accordance with an aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Data communication over optical medium offers substantial advantage over data communication over electrical medium. For example, higher bandwidth and data rates may be achieved using optical fiber transmission compared to electrical wire transmission. Data transmission over optical cables allows the use of wavelength division multiplexing (WDM) and polarization multiplexing compared to electrical cable transmission. Data transmission over optical fibers are typically significantly less lossy and more distortion immune compared to data transmission over electrical wires. Data transmission over optical fibers are also less susceptible to noise and interference from wireless signals, and electromagnetic interference (EMI).

Active optical cables (AOCs) may employ an electrical-to-optical (E2O) converter housed in a first cable connector configured to attach to a source of an electrical data signal, and an optical-to-electrical (O2E) converter housed in a second cable connector configured to attach to a sink or receptor of the electrical data signal. The E2O converter converts the electrical data signal into an optical data signal, and the O2E converter converts the optical data signal to regenerate the electrical data signal. AOCs typically employ one or more optical mediums or fibers to transmit the optical data signal from the first cable connector to the second cable connector.

The first cable connector may employ a multi-mode vertical cavity surface emitting laser (VCSEL) to effectuate the conversion of the electrical data signal into the optical data signal for transmission via the one or more optical fibers. Multi-mode VCSEL based links have gained in popularity due to its ease of optical alignment and lower assembly/production costs.

However, there are several drawbacks with the aforementioned approach. For example, generally VCSEL modulation bandwidth cannot be increased much beyond 35 giga Hertz (GHz). Thus, in order to increase the data rates through such cables, the number of optical channels is increased, which typically has the adverse effects of increasing the cost of the cables and complexity in reducing skew between the channels. Further, to achieve the higher data rates, modulation complexity is also increased from pulse amplitude modulation (PAM)-2 (two levels) to PAM-4 (four levels) or even to PAM-8 (eight levels), which typically requires complex digital signal processing (DSP) that often increase latency, power, and costs. Other approaches use electro-absorption modulated lasers (EMLs) or silicon-photonics Mach-Zehnder modulators (MZMs); but these approaches typically have higher component and assembly costs.

FIG. 1 illustrates a block diagram of an example data communication cable assembly 100 in accordance with an aspect of the disclosure. In summary, the data communication cable assembly 100 utilizes coherent optical modulation to form a set of data or electrical modulation channels. For example, the coherent optical modulation may use in-phase and quadrature-phase (I/Q) modulation to form two (2) data channels. Additionally, the coherent optical modulation may use orthogonal polarization to provide an additional two (2) data channels for a total of four (4) data channels. It shall be understood that each of the four (4) data channels may use higher order modulation than PAM-4 (e.g., using 16 (or more) quadrature amplitude modulation (QAM)).

In particular, the data communication cable assembly 100 includes a cable 110, a first connector 120 mechanically coupled to a first end of the cable 110, and a second connector 160 mechanically coupled to a second (opposite) end of the cable 110. The first connector 120 is configured to connect to a first device 190 for receiving a first electrical data signal therefrom and providing a regenerated second electrical data signal thereto. Similarly, the second connector 160 is configured to connect to a second device 195 for providing the regenerated first electrical data signal thereto and receiving the second electrical data signal therefrom.

The cable 110 may include a first optical medium or fiber 150 for routing a first optical data signal from the first connector 120 to the second connector 160, and a second optical medium or fiber 155 for routing a second optical data signal from the second connector 160 to the first connector 120. It shall be understood that the cable 110 may use a single optical fiber to facilitate the aforementioned transmissions of the first and second optical data signals using wavelength division multiplexing (WDM). Although the data communication cable assembly 100 is described as facilitating bidirectional data communication, it shall be understood that the data communication cable assembly 100 may be implemented to provide unidirectional data communication.

The data communication cable assembly 100 includes a first coherent optical transceiver (Tx/Rx) 125, which may be housed in the first connector 120. The first coherent optical transceiver 125 is configured to receive the first electrical data signal from the first device 190, and perform coherent optical modulation on the first electrical data signal to generate the first optical data signal including a set of data channels (e.g., four (4) data channels) for transmission via the optical fiber 150. The first coherent optical transceiver 125 is also configured to receive the second optical data signal from the optical fiber 155, and perform coherent optical demodulation on the second optical data signal including a set of data channels (e.g., four (4) data channels) to regenerate the second electrical data signal for the first device 190.

Similarly, the data communication cable assembly 100 includes a second coherent optical transceiver (Tx/Rx) 165, which may be housed in the second connector 160. The second coherent optical transceiver 165 is configured to receive the first optical data signal from the optical fiber 150, and perform coherent optical demodulation on the first optical data signal to regenerate the first electrical data signal for the second device 195. The second coherent optical transceiver 165 is also configured to receive the second electrical data signal from the second device 195, and perform coherent optical modulation on the second electrical data signal to generate the second optical data signal for transmission via the optical fiber 155.

By using coherent optical modulation, a single optical fiber may carry an optical signal including a set of data channels (e.g., four (4) or more data channels) to increase the data throughput beyond 100 gigabits per second (Gbps) (e.g., up to 400 Gbps or more). Further, using coherent optical modulation allows the data communication cable assembly 100 to use a relatively small number of optical fibers (e.g., one or two) for low costs, assembly, and power dissipation benefits. Moreover, as alluded to, the number of data channels may further be increased by using wavelength division modulation (WDM) in addition to I/Q and orthogonal polarization modulations.

Figure 2:
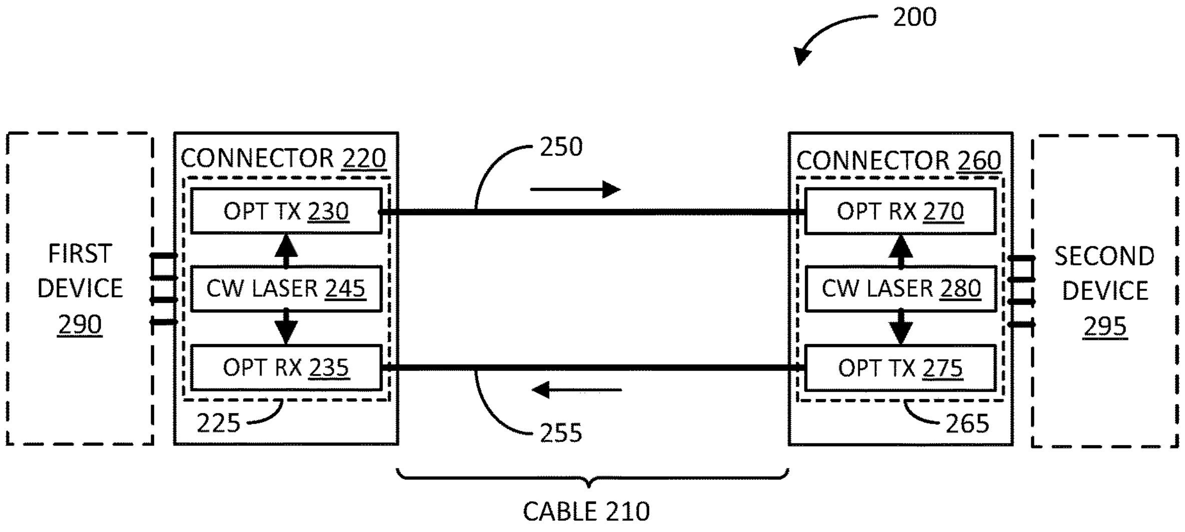
FIG. 2 illustrates a block diagram of another example data communication cable assembly in accordance with another aspect of the disclosure.

FIG. 2 illustrates a block diagram of another example data communication cable assembly 200 in accordance with another aspect of the disclosure. The data communication cable assembly 200 may be an example detailed implementation of the data communication cable assembly 100 previously discussed.

In particular, the data communication cable assembly 200 includes a cable 210, a first connector 220 mechanically coupled to a first end of the cable 210, and a second connector 260 mechanically coupled to a second (opposite) end of the cable 210. The first connector 220 is configured to connect to a first device 290 for receiving a first electrical data signal therefrom and providing a regenerated second electrical data signal thereto. Similarly, the second connector 260 is configured to connect to a second device 295 for providing the first electrical data signal thereto and receiving the second electrical data signal therefrom.

The cable 210 may include a first optical medium or fiber 250 for routing a first optical data signal from the first connector 220 to the second connector 260, and a second optical medium or fiber 255 for routing a second optical data signal from the second connector 260 to the first connector 220. It shall be understood that the cable 210 may use a single optical fiber to facilitate the aforementioned transmissions of the first and second optical data signals using WDM. Although the data communication cable assembly 200 is described as facilitating bidirectional data communication, it shall be understood that the data communication cable assembly 200 may be implemented to provide unidirectional data communication.

The data communication cable assembly 200 includes a first coherent optical heterodyne transceiver (Tx/Rx) 225, which may be housed in the first connector 220. The first coherent optical transceiver 225 is configured to receive the first electrical data signal from the first device 290, and perform coherent optical modulation on the first electrical data signal to generate the first optical data signal including a set of data channels (e.g., four (4) data channels) for transmission via the optical fiber 250. In this regard, the first coherent optical transceiver 225 includes a continuous wave (CW) laser 245 and an optical transmitter 230. The optical transmitter 230 is configured to coherently modulate an optical carrier generated by the CW laser 245 with the first electrical data signal to generate the first optical data signal.

The first coherent optical transceiver 225 is also configured to receive the second optical data signal from the optical fiber 255, and perform coherent optical demodulation on the second optical data signal including a set of data channels (e.g., four (4) data channels) to regenerate the second electrical data signal for the first device 290. In this regard, the first coherent optical transceiver 225 includes an optical receiver 235 configured to coherently demodulate the second optical data signal using the optical carrier generated by the CW laser 245 to regenerate the second electrical data signal.

Similarly, the data communication cable assembly 200 includes a second coherent optical heterodyne transceiver (Tx/Rx) 265, which may be housed in the second connector 260. The second coherent optical transceiver 265 is configured to receive the first optical data signal from the optical fiber 250, and perform coherent optical demodulation on the first optical data signal to regenerate the first electrical data signal for the second device 295. In this regard, the second coherent optical transceiver 265 includes a CW laser 280 and an optical receiver 270. The optical receiver 270 is configured to coherently demodulate the first optical data signal using an optical carrier generated by the CW laser 280 to regenerate the first electrical data signal.

The second coherent optical transceiver 265 is also configured to receive the second electrical data signal from the second device 295, and perform coherent optical modulation on the second electrical data signal to generate the second optical data signal for transmission via the optical fiber 255. In this regard, the second coherent optical transceiver 265 includes an optical transmitter 265 configured to coherently modulated the optical carrier generated by the CW laser 280 with the second electrical data signal to generate the second optical data signal.

Figure 3:
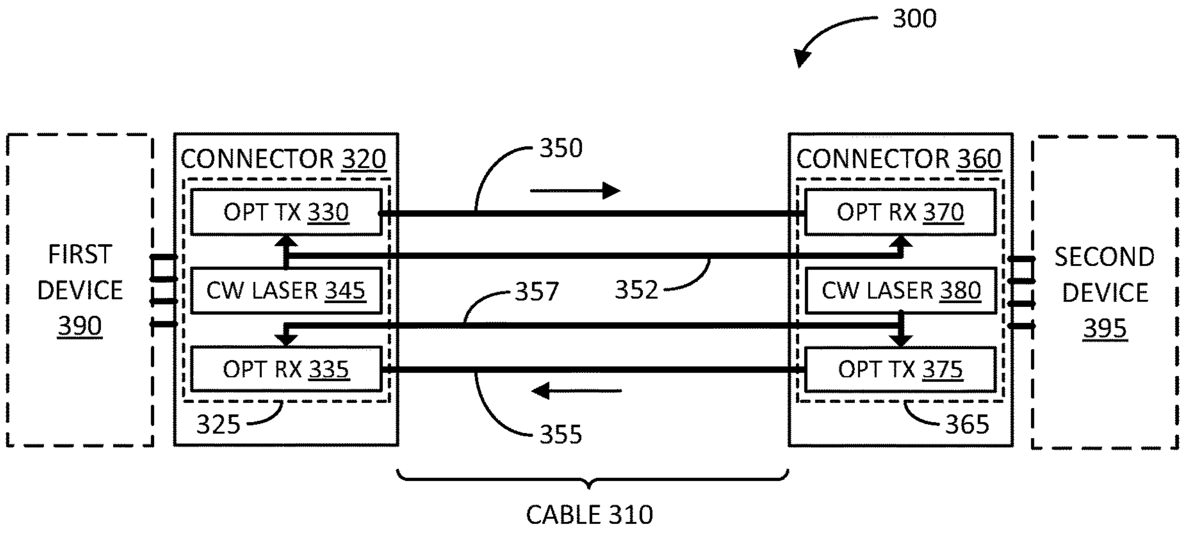
FIG. 3 illustrates a block diagram of another example data communication cable assembly in accordance with another aspect of the disclosure.

FIG. 3 illustrates a block diagram of another example data communication cable assembly 300 in accordance with another aspect of the disclosure. The data communication cable assembly 300 is another variation of data communication cable assembly 100 or 200 previously discussed.

In particular, the data communication cable assembly 300 includes a cable 310, a first connector 320 mechanically coupled to a first end of the cable 310, and a second connector 360 mechanically coupled to a second (opposite) end of the cable 310. The first connector 320 is configured to connect to a first device 390 for receiving a first electrical data signal therefrom and providing a regenerated second electrical data signal thereto. Similarly, the second connector 360 is configured to connect to a second device 395 for providing the regenerated first electrical data signal thereto and receiving the second electrical data signal therefrom.

The cable 310 may include a first optical medium or fiber 350 for routing a first optical data signal from the first connector 320 to the second connector 360, and a second optical medium or fiber 355 for routing a second optical data signal from the second connector 360 to the first connector 320. It shall be understood that the cable 310 may use a single optical fiber to facilitate the aforementioned transmissions of the first and second optical data signals using WDM. Additionally, the cable 310 includes a third optical medium or fiber 352 for routing a first optical carrier from the first connector 320 to the second connector 360, and a fourth optical medium or fiber 357 for routing a second optical carrier from the second connector 360 to the first connector 320. Although the data communication cable assembly 300 is described as facilitating bidirectional data communication, it shall be understood that the data communication cable assembly 300 may be implemented to provide unidirectional data communication.

The data communication cable assembly 300 includes a first coherent optical transceiver (Tx/Rx) 325, which may be housed in the first connector 320. The first coherent optical transceiver 325 is configured to receive the first electrical data signal from the first device 390, and perform coherent optical modulation on the first electrical data signal to generate the first optical data signal including a set of data channels (e.g., four (4) data channels) for transmission via the optical fiber 350. In this regard, the first coherent optical transceiver 325 includes a continuous wave (CW) laser 345 and an optical homodyne transmitter 330. The optical transmitter 330 is configured to coherently modulate the first optical carrier generated by the CW laser 345 with the first electrical data signal to generate the first optical data signal.

The first coherent optical transceiver 325 is also configured to receive the second optical data signal from the optical fiber 355, and perform coherent optical demodulation on the second optical data signal including a set of data channels (e.g., four (4) data channels) to regenerate the second electrical data signal for the first device 390. In this regard, the first coherent optical transceiver 325 includes an optical homodyne receiver 335 configured to coherently demodulate the second optical data signal using the second optical carrier received via the optical fiber 357.

Similarly, the data communication cable assembly 300 includes a second coherent optical transceiver (Tx/Rx) 365, which may be housed in the second connector 360. The second coherent optical transceiver 365 is configured to receive the first optical data signal from the optical fiber 350, and perform coherent optical demodulation on the first optical data signal to regenerate the first electrical data signal for the second device 395. In this regard, the second coherent optical transceiver 365 includes an optical homodyne receiver 370 configured to coherently demodulate the first optical data signal using the first optical carrier received from the CW laser 345 via the optical fiber 352.

The second coherent optical transceiver 365 is also configured to receive the second electrical data signal from the second device 395, and perform coherent optical modulation on the second electrical data signal to generate the second optical data signal for transmission via the optical fiber 355. In this regard, the second coherent optical transceiver 365 includes an optical homodyne transmitter 375 configured to coherently modulated the second optical carrier generated by the CW laser 380 with the second electrical data signal to generate the second optical data signal.

Thus, in data cable communication assembly 300, the CW laser 345 at the first connector 320 generates the first optical carrier for performing modulation by the optical transmitter 330 at the first connector 320, and performing demodulation by the optical receiver 370 at the second connector 360. Similarly, the CW laser 380 at the second connector 360 generates the second optical carrier for performing modulation by the optical transmitter 375 at the second connector 360, and performing demodulation by the optical receiver 335 at the first connector 320.

It shall be understood that if the CW lasers 345 and 380 generate different wavelengths optical carriers, the data communication cable assembly 300 may be implemented with a single fiber instead of the two optical fibers 350 and 355.

Figure 4:
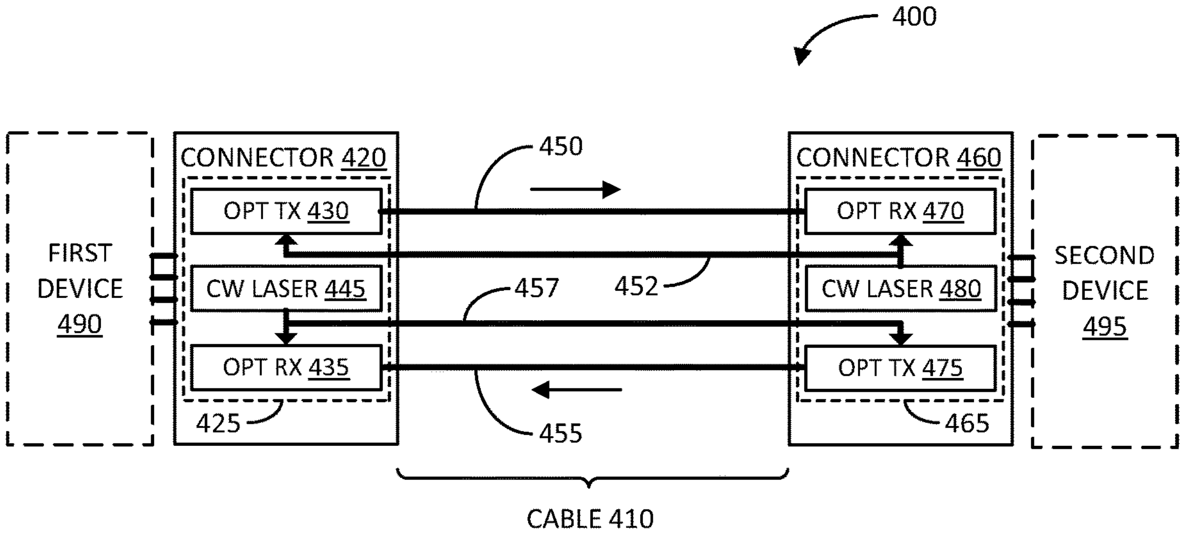
FIG. 4 illustrates a block diagram of another example data communication cable assembly in accordance with another aspect of the disclosure.

FIG. 4 illustrates a block diagram of another example data communication cable assembly 400 in accordance with another aspect of the disclosure. The data communication cable assembly 400 is a variation of data communication cable assembly 100, 200, or 300 previously discussed.

In particular, the data communication cable assembly 400 includes a cable 410, a first connector 420 mechanically coupled to a first end of the cable 410, and a second connector 460 mechanically coupled to a second (opposite)

end of the cable 410. The first connector 420 is configured to connect to a first device 490 for receiving a first electrical data signal therefrom and providing a regenerated second electrical data signal thereto. Similarly, the second connector 460 is configured to connect to a second device 495 for providing the regenerated first electrical data signal thereto and receiving the second electrical data signal therefrom.

The cable 410 may include a first optical medium or fiber 450 for routing a first optical data signal from the first connector 420 to the second connector 460, and a second optical medium or fiber 455 for routing a second optical data signal from the second connector 460 to the first connector 420. It shall be understood that the cable 410 may use a single optical fiber to facilitate the aforementioned transmissions of the first and second optical data signals using WDM. Additionally, the cable 410 includes a third optical medium or fiber 452 for routing a first optical carrier from the second connector 460 to the first connector 420, and a fourth optical medium or fiber 457 for routing a second optical carrier from the first connector 420 to the second connector 460. Although the data communication cable assembly 400 is described as facilitating bidirectional data communication, it shall be understood that the data communication cable assembly 400 may be implemented to provide unidirectional data communication.

The data communication cable assembly 400 includes a first coherent optical transceiver (Tx/Rx) 425, which may be housed in the first connector 420. The first coherent optical transceiver 425 is configured to receive the first electrical data signal from the first device 490, and perform coherent optical modulation on the first electrical data signal to generate the first optical data signal including a set of data channels (e.g., four (4) data channels) for transmission via the optical fiber 450. In this regard, the first coherent optical transceiver 425 includes an optical homodyne transmitter 430 configured to coherently modulate a first optical carrier received via the third optical fiber 452.

The first coherent optical transceiver 425 is also configured to receive the second optical data signal from the optical fiber 455, and perform coherent optical demodulation on the second optical data signal including a set of data channels (e.g., four (4) data channels) to regenerate the second electrical data signal for the first device 490. In this regard, the first coherent optical transceiver 425 includes an optical homodyne receiver 435 and a continuous wave (CW) laser 445. The optical receiver 435 is configured to coherently demodulate the second optical data signal using the second optical carrier generated by the CW laser 445.

Similarly, the data communication cable assembly 400 includes a second coherent optical transceiver (Tx/Rx) 465, which may be housed in the second connector 460. The second coherent optical transceiver 465 is configured to receive the first optical data signal from the optical fiber 450, and perform coherent optical demodulation on the first optical data signal to regenerate the first electrical data signal for the second device 495. In this regard, the second coherent optical transceiver 465 includes an optical homodyne receiver 470 and a CW laser 480. The optical receiver 470 is configured to coherently demodulate the first optical data signal using the first optical carrier generated by the CW laser 480.

The second coherent optical transceiver 465 is also configured to receive the second electrical data signal from the second device 495, and perform coherent optical modulation on the second electrical data signal to generate the second optical data signal for transmission via the optical fiber 455. In this regard, the second coherent optical transceiver 465 includes an optical homodyne transmitter 475 configured to coherently modulated the second optical carrier received from the fourth optical fiber 457 with the second electrical data signal to generate the second optical data signal.

Thus, in data cable communication assembly 400, the CW laser 480 at the second connector 460 generates the first optical carrier for performing modulation by the optical transmitter 430 at the first connector 420, and performing demodulation by the optical receiver 470 at the second connector 460. Similarly, the CW laser 445 at the first connector 420 generates the second optical carrier for performing modulation by the optical transmitter 475 at the second connector 460, and performing demodulation by the optical receiver 435 at the first connector 420.

Figure 5:
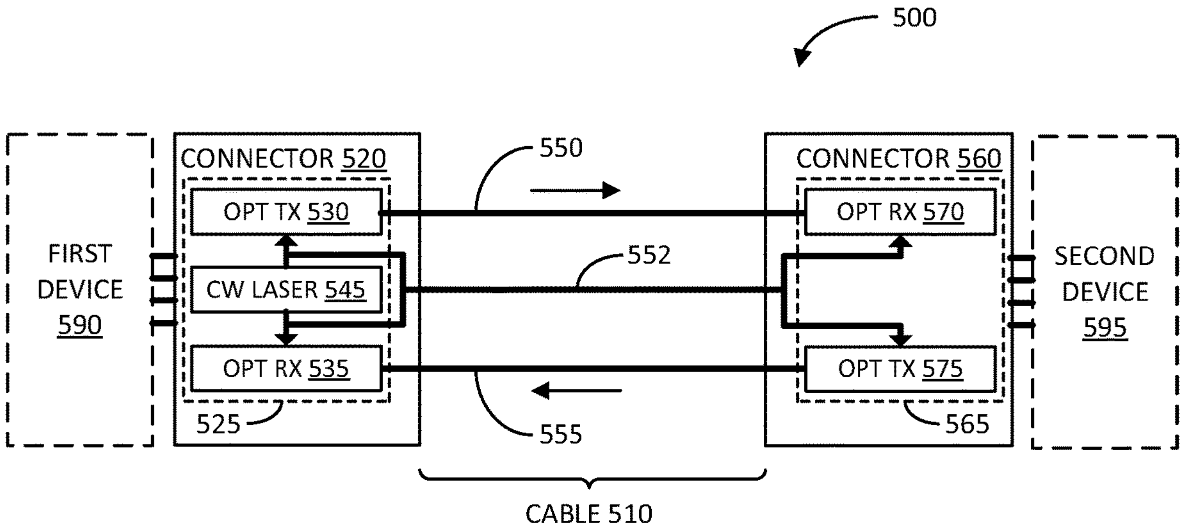
FIG. 5 illustrates a block diagram of another example data communication cable assembly in accordance with another aspect of the disclosure.

FIG. 5 illustrates a block diagram of another example data communication cable assembly 500 in accordance with another aspect of the disclosure. The data communication cable assembly 500 is a variation of data communication cable assembly 100, 200, 300, or 400 previously discussed.

In particular, the data communication cable assembly 500 includes a cable 510, a first connector 520 mechanically coupled to a first end of the cable 510, and a second connector 560 mechanically coupled to a second (opposite) end of the cable 510. The first connector 520 is configured to connect to a first device 590 for receiving a first electrical data signal therefrom and providing a regenerated second electrical data signal thereto. Similarly, the second connector 560 is configured to connect to a second device 595 for providing the regenerated first electrical data signal thereto and receiving the second electrical data signal therefrom.

The cable 510 includes a first optical medium or fiber 550 for routing a first optical data signal from the first connector 520 to the second connector 560, and a second optical medium or fiber 555 for routing a second optical data signal from the second connector 560 to the first connector 520. It shall be understood that the cable 510 may use a single optical fiber to facilitate the aforementioned transmissions of the first and second optical data signals using WDM. Additionally, the cable 510 includes a third optical medium or fiber 552 for routing an optical carrier from the first connector 520 to the second connector 560. Although the data communication cable assembly 500 is described as facilitating bidirectional data communication, it shall be understood that the data communication cable assembly 500 may be implemented to provide unidirectional data communication.

The data communication cable assembly 500 includes a first coherent optical transceiver (Tx/Rx) 525, which may be housed in the first connector 520. The first coherent optical transceiver 525 is configured to receive the first electrical data signal from the first device 590, and perform coherent optical modulation on the first electrical data signal to generate the first optical data signal including a set of data channels (e.g., four (4) data channels) for transmission via the optical fiber 550. In this regard, the first coherent optical transceiver 525 includes an optical homodyne transmitter 530 and a continuous wave (CW) laser 545. The optical transmitter 530 is configured to coherently modulate the optical carrier generated by the CW laser 545.

The first coherent optical transceiver 525 is also configured to receive the second optical data signal from the optical fiber 555, and perform coherent optical demodulation on the second optical data signal including a set of data channels (e.g., four (4) data channels) to regenerate the second electrical data signal for the first device 590. In this regard, the first coherent optical transceiver 525 includes an optical receiver 535 configured to coherently demodulate the second optical data signal using the optical carrier generated by the CW laser 545.

Similarly, the data communication cable assembly 500 includes a second coherent optical transceiver (Tx/Rx) 565, which may be housed in the second connector 560. The second coherent optical transceiver 565 is configured to receive the first optical data signal from the optical fiber 550, and perform coherent optical demodulation on the first optical data signal to regenerate the first electrical data signal for the second device 595. In this regard, the second coherent optical transceiver 565 includes an optical homodyne receiver 570 configured to coherently demodulate the first optical data signal using optical carrier received from the CW laser 545 via the third optical fiber 552.

The second coherent optical transceiver 565 is also configured to receive the second electrical data signal from the second device 595, and perform coherent optical modulation on the second electrical data signal to generate the second optical data signal for transmission via the optical fiber 555. In this regard, the second coherent optical transceiver 565 includes an optical transmitter 575 configured to coherently modulated the optical carrier received from the CW laser 545 via the third optical fiber 552 with the second electrical data signal to generate the second optical data signal.

Thus, in data cable communication assembly 500, the CW laser 545 at the first connector 520 generates the optical carrier for performing modulation by the optical transmitter 530 at the first connector 520, performing demodulation by the optical homodyne receiver 535 at the first connector 520, performing modulation by the optical homodyne transmitter 575 at the second connector 560, and performing demodulation by the optical receiver 570 at the second connector 560.

Figure 6:
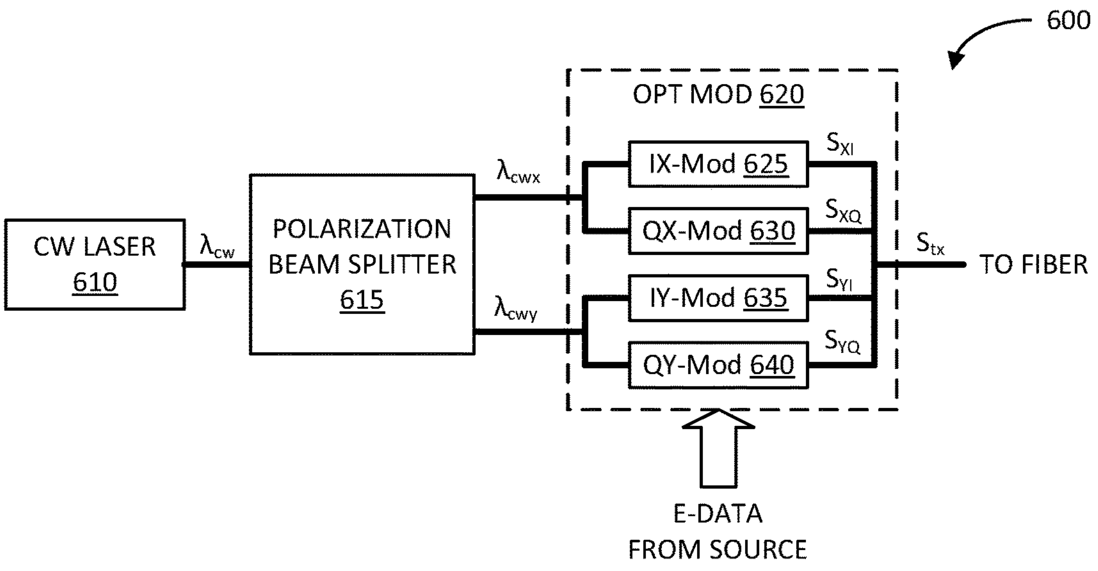
FIG. 6 illustrates a block diagram of an example coherent optical transmitter in accordance with another aspect of the disclosure.

FIG. 6 illustrates a block diagram of an example coherent optical transmitter 600 in accordance with another aspect of the disclosure. The coherent optical transmitter 600 may be an example detailed implementation of any of the coherent optical transmitters 230, 275, 330, 375, 430, 475, 530, and 575 including the corresponding continuous wave (CW) lasers 245, 280, 345, 380, 445, 480, and 545 previously discussed.

The optical transmitter 600 includes a CW laser 610, an polarization beam splitter 615, and an optical quadrature modulator 620. The CW laser 610 is configured to generate an optical carrier $\lambda_{cw}$. The polarization beam splitter 615 is configured to polarize the optical carrier New to generate orthogonally polarized optical carriers $\lambda_{cwx}$ and $\lambda_{cwy}$. The optical quadrature modulator 620 is configured to quadrature modulate the x-polarized optical carrier $\lambda_{cwx}$ with an electrical data signal from a source device to generate I- and Q-modulated optical signals $S_{XI}$ and $S_{XQ}$, respectively. Similarly, the optical quadrature modulator 620 is configured to quadrature modulate the y-polarized optical carrier $\lambda_{cwy}$ with the electrical data signal from the source device to generate I- and Q-modulated optical signals $S_{YI}$ and $S_{YQ}$, respectively. The quadrature-modulated optical signals $S_{XI}$, $S_{XQ}$, $S_{YI}$, and $S_{YQ}$ (e.g., four (4) data channels) are combined at the output of the optical modulator 620 to generate a transmit optical signal $S_{tx}$ for transmission via an optical fiber to the opposing connector of the corresponding data communication cable assembly.

Figure 7:
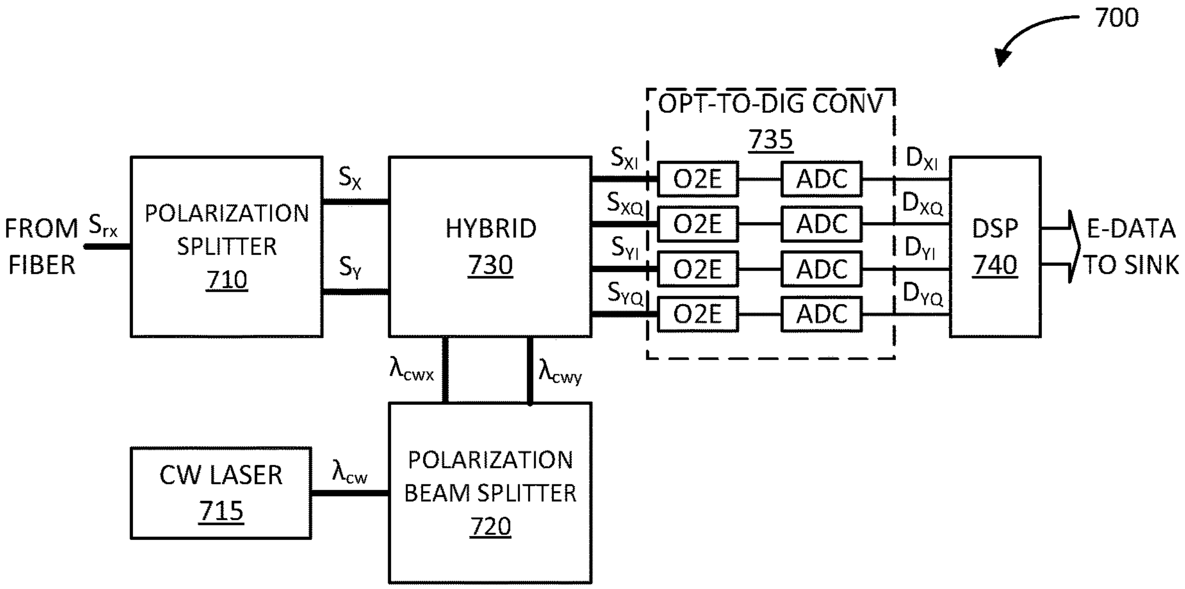
FIG. 7 illustrates a block diagram of an example coherent optical receiver in accordance with another aspect of the disclosure.

FIG. 7 illustrates a block diagram of an example coherent optical receiver 700 in accordance with another aspect of the disclosure. The coherent optical receiver 700 may be an example detailed implementation of any of the coherent optical receivers 235, 270, 335, 370, 435, 470, 535, and 570 including the corresponding continuous wave (CW) lasers 245, 280, 345, 380, 445, 480, and 545 previously discussed.

The optical receiver 700 includes a CW laser 715, a polarization beam splitter 720, a polarization splitter 710, a hybrid 730, an optical-to-digital converter 735, and a digital signal processor (DSP) 740. The CW laser 715 is configured to generate an optical carrier $\lambda_{cw}$. The polarization beam splitter 720 is configured to polarize the optical carrier $\lambda_{cw}$ to generate orthogonally polarized optical carriers $\lambda_{cwx}$ and $\lambda_{cwy}$. The polarization splitter 710 is configured to receive an optical data signal $S_{rx}$ from an opposing connector via an optical fiber of a data communication cable assembly, and perform polarization splitting of the optical data signal $S_{rx}$ to generate orthogonally polarized optical data signals $S_X$ and $S_Y$, respectively. The received optical data signal $S_{rx}$ may be the transmit optical data signal $S_{tx}$ of the optical transmitter 600 after propagating through the optical fiber.

The hybrid 730 is configured to combine the orthogonally polarized optical data signals $S_X$ and $S_Y$ with the x- and y-polarized optical carriers $\lambda_{cwx}$ and $\lambda_{cwy}$ to generate quadrature x-polarized optical data signals $S_{XI}$ and $S_{XQ}$, and quadrature y-polarized optical data signals $S_{YI}$ and $S_{YQ}$. The optical-to-digital converter 735 includes a set of optical-to-electrical (O2E) converters (e.g., each including a photo detector (PD) and a transimpedance amplifier (TIA)) and a set of analog-to-digital converters (ADCs). The set of O2Es are configured to convert the optical data signals $S_{XI}$, $S_{XQ}$, $S_{YI}$, and $S_{YQ}$ into electrical analog data signals, and the set of ADCs are configured to convert the electrical analog data signals into digital data signals $D_{XI}$, $D_{XQ}$, $D_{YI}$, and $D_{YQ}$, respectively. The DSP 740 is configured to combine the digital data signals $D_{XI}$, $D_{XQ}$, $D_{YI}$, and $D_{YQ}$ to generate the electrical data signals for a data sink device.

Figure 8:
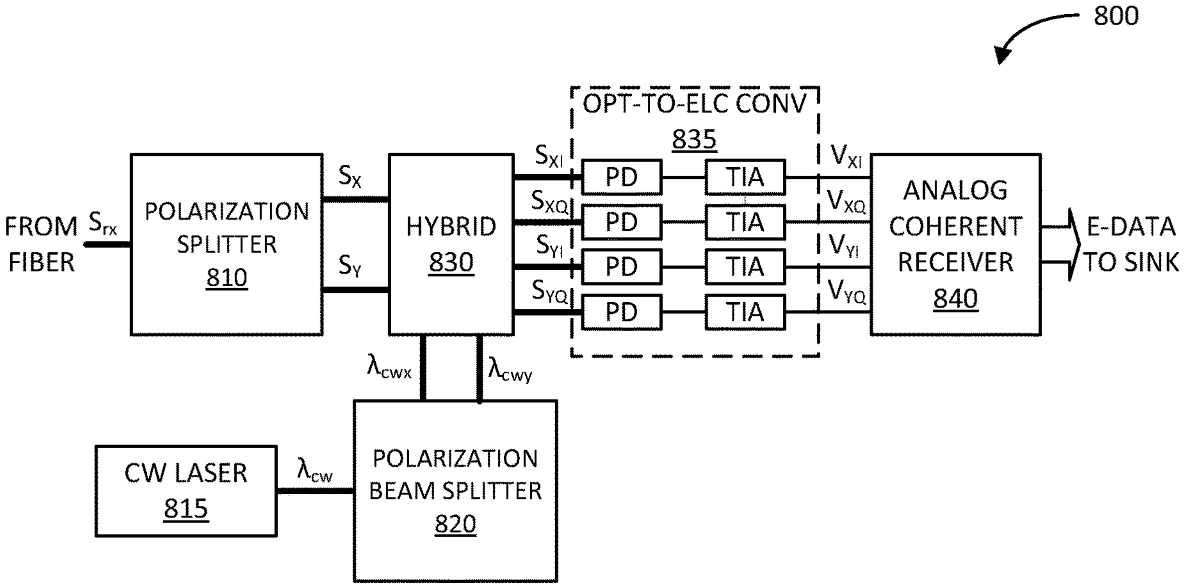
FIG. 8 illustrates a block diagram of another example coherent optical receiver in accordance with another aspect of the disclosure.

FIG. 8 illustrates a block diagram of another example coherent optical receiver 800 in accordance with another aspect of the disclosure. The coherent optical receiver 800 may be an example detailed implementation of any of the coherent optical receivers 235, 270, 335, 370, 435, 470, 535, and 570 including the corresponding continuous wave (CW) lasers 245, 280, 345, 380, 445, 480, and 545 previously discussed.

The optical receiver 800 includes a CW laser 815, a polarization beam splitter 820, a polarization splitter 810, a hybrid 830, an optical-to-electrical converter 835, and an optical coherent receiver 840. The CW laser 715 is configured to generate an optical carrier $\lambda_{cw}$. The polarization beam splitter 820 is configured to polarize the optical carrier how to generate orthogonally polarized optical carriers $\lambda_{cwx}$ and $\lambda_{cwy}$. The polarization splitter 810 is configured to receive an optical data signal $S_{rx}$ from an opposing connector via an optical fiber of a data communication cable assembly, and perform polarization splitting of the optical data signal $S_{rx}$ to generate orthogonally polarized optical data signals $S_X$ and $S_Y$, respectively. The received optical data signal $S_{rx}$ may be the transmit optical data signal $S_{tx}$ of the optical transmitter 600 after propagating through the optical fiber.

The hybrid 830 is configured to combine the orthogonally polarized optical data signals $S_X$ and $S_Y$ with the x- and y-polarized optical carriers $\lambda_{cwx}$ and $\lambda_{cwy}$ to generate quadrature x-polarized optical data signals $S_{XI}$ and $S_{XQ}$, and quadrature y-polarized optical data signals $S_{YI}$ and $S_{YQ}$. The optical-to-electrical converter 835 includes a set of photo detectors (PDs) and a set of transimpedance amplifiers (TIAs). The sets of PDs/TIAs are configured to convert the optical data signals $S_{XI}$, $S_{XQ}$, $S_{YI}$, and $S_{YQ}$ into electrical analog signals $V_{XI}$, $V_{XQ}$, $V_{YI}$, and $V_{YQ}$, respectively. The analog coherent receiver 840 is configured to combine the electrical analog signals $V_{XI}$, $V_{XQ}$, $VD_{YI}$, and $V_{YQ}$ to generate the electrical data signals for a data sink device.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A data communication cable assembly, comprising:

a first connector configured to connect to a first device, wherein the first connector includes a first coherent optical transmitter configured to:

receive a first electrical data signal from the first device; and coherently modulate a first optical carrier with the first electrical data signal to generate a first optical data signal;

wherein the first connector further comprises a first continuous wave (CW) laser configured to generate the first optical carrier;

a cable including a first end mechanically coupled to the first connector, wherein the cable comprises at least one optical fiber; and a second connector mechanically coupled to a second end of the cable, and configured to connect to a second device, wherein the second connector includes a first coherent optical receiver configured to:

receive the first optical data signal from the first coherent optical transmitter via the at least one optical fiber; and coherently demodulate the first optical data signal using the first optical carrier received via the at least one fiber to regenerate the first electrical data signal for the second device.

2. The data communication cable assembly of claim 1, wherein:

the second connector further comprises a second coherent optical transmitter configured to:

receive a second electrical data signal from the second device; and coherently modulate the first or second optical carrier with the second electrical data signal to generate a second optical data signal; and the first connector further comprises a second coherent optical receiver configured to:

receive the second optical data signal from the second coherent optical transmitter via the at least one optical fiber; and coherently demodulate the second optical data signal using the first or second optical carrier to regenerate the second electrical data signal for the first device.

3. The data communication cable assembly of claim 1, wherein the first coherent optical transmitter includes a quadrature modulator configured to quadrature modulate the first optical carrier to generate the first optical data signal including I- and Q-optical data signals, respectively.

4. The data communication cable assembly of claim 1, wherein the first coherent optical receiver includes a polarization splitter configured to quadrature split the first optical data signal into orthogonally polarized optical data signals, wherein the first coherent optical receiver is configured to coherently demodulate the orthogonally polarized optical data signals using the first or second optical carrier to regenerate the first electrical data signal.

5. The data communication cable assembly of claim 1, wherein the first coherent optical receiver includes a polarization beam splitter configured to polarize the first or second optical carrier to generate first and second orthogonally polarized optical carriers, wherein the first coherent optical receiver is configured to coherently demodulate the first optical data signal using the first and second orthogonally polarized optical carriers to regenerate the first electrical data signal.

6. The data communication cable assembly of claim 1, wherein the first coherent optical receiver comprises:

a polarization splitter configured to split the first optical data signal into orthogonally polarized optical data signals;

a polarization beam splitter configured to polarize the first or second optical carrier to generate first and second orthogonally polarized optical carriers;

a hybrid configured to combine the orthogonally polarized optical data signals with the first and second orthogonally polarized optical carriers to generate first orthogonally polarized I- and Q-optical data signal and second orthogonally polarized I- and Q-optical data signals;

an optical-to-digital-converter configured to convert the first orthogonally polarized I- and Q-optical data signal and second orthogonally polarized I- and Q-optical data signals into a set of digital signals; and a digital signal processor (DSP) configured to regenerate the first electrical data signal based on the set of digital signals.

7. A data communication cable assembly, comprising:

a first connector configured to connect to a first device, wherein the first connector includes a first coherent optical transmitter configured to:

receive a first electrical data signal from the first device; and coherently modulate a first optical carrier with the first electrical data signal to generate a first optical data signal;

a cable including a first end mechanically coupled to the first connector, wherein the cable comprises at least one optical fiber; and a second connector mechanically coupled to a second end of the cable, and configured to connect to a second device, wherein the second connector includes a first coherent optical receiver configured to:

receive the first optical data signal from the first coherent optical transmitter via the at least one optical fiber; and coherently demodulate the first optical data signal using the first or a second optical carrier to regenerate the first electrical data signal for the second device;

wherein the second connector further comprises a first continuous wave (CW) laser configured to generate the first optical carrier, wherein the first coherent optical transmitter is configured to receive the first optical carrier via the at least one optical fiber.

8. The data communication cable assembly of claim 7, wherein the first coherent optical receiver is configured to coherently demodulate the first optical data signal using the first optical carrier.

9. A data communication cable assembly, comprising:

a first connector configured to connect to a first device, wherein the first connector includes a first coherent optical transmitter configured to:

receive a first electrical data signal from the first device; and coherently modulate a first optical carrier with the first electrical data signal to generate a first optical data signal;

a cable including a first end mechanically coupled to the first connector, wherein the cable comprises at least one optical fiber; and a second connector mechanically coupled to a second end of the cable, and configured to connect to a second device, wherein the second connector includes a first coherent optical receiver configured to:

receive the first optical data signal from the first coherent optical transmitter via the at least one optical fiber; and coherently demodulate the first optical data signal using the first or a second optical carrier to regenerate the first electrical data signal for the second device;

wherein the first coherent optical transmitter includes a polarization beam splitter configured to polarize the first optical carrier to generate first and second orthogonally polarized optical carriers, wherein the first coherent optical transmitter is configured to coherently modulate the first and second orthogonally polarized optical carriers to generate the first optical data signal including first and second orthogonally polarized optical data signals, respectively.

10. A data communication cable assembly of claim 1, comprising:

a first connector configured to connect to a first device, wherein the first connector includes a first coherent optical transmitter configured to:

receive a first electrical data signal from the first device; and coherently modulate a first optical carrier with the first electrical data signal to generate a first optical data signal;

a cable including a first end mechanically coupled to the first connector, wherein the cable comprises at least one optical fiber; and a second connector mechanically coupled to a second end of the cable, and configured to connect to a second device, wherein the second connector includes a first coherent optical receiver configured to:

receive the first optical data signal from the first coherent optical transmitter via the at least one optical fiber; and coherently demodulate the first optical data signal using the first or a second optical carrier to regenerate the first electrical data signal for the second device;

wherein the first coherent optical transmitter comprises:

a polarization beam splitter configured to polarize the first optical carrier to generate first and second orthogonally polarized optical carriers; and a quadrature modulator configured to:

quadrature modulate the first orthogonally polarized optical carrier with the first electrical data signal to generate the first optical data signal including first orthogonally polarized I- and Q-optical data signals; and quadrature modulate the second orthogonally polarized optical carrier with the first electrical data signal to generate the first optical data signal including second orthogonally polarized I- and Q-optical data signals.

11. A data communication cable assembly, comprising:

a first connector configured to connect to a first device, wherein the first connector includes a first coherent optical transmitter configured to:

receive a first electrical data signal from the first device; and coherently modulate a first optical carrier with the first electrical data signal to generate a first optical data signal;

a cable including a first end mechanically coupled to the first connector, wherein the cable comprises at least one optical fiber; and a second connector mechanically coupled to a second end of the cable, and configured to connect to a second device, wherein the second connector includes a first coherent optical receiver configured to:

receive the first optical data signal from the first coherent optical transmitter via the at least one optical fiber; and coherently demodulate the first optical data signal using the first or a second optical carrier to regenerate the first electrical data signal for the second device;

wherein the first coherent optical receiver comprises:

a polarization splitter configured to split the first optical data signal into orthogonally polarized optical data signals;

a polarization beam splitter configured to polarize the first or second optical carrier to generate first and second orthogonally polarized optical carriers;

a hybrid configured to combine the orthogonally polarized optical data signals with the first and second orthogonally polarized optical carriers to generate first orthogonally polarized I- and Q-optical data signal and second orthogonally polarized I- and Q-optical data signals;

an optical-to-electrical-converter configured to convert the first orthogonally polarized I- and Q-optical data signal and second orthogonally polarized I- and Q-optical data signals into a set of analog signals; and an analog coherent receiver to regenerate the first electrical data signal based on the set of analog signals.

* * * * *